(12) United States Patent
Dartez

(10) Patent No.: US 10,752,530 B1
(45) Date of Patent: Aug. 25, 2020

(54) SUBMERSIBLE AERATOR AND MIXING APPARATUS

(71) Applicant: James Dartez, New Orleans, LA (US)

(72) Inventor: James Dartez, New Orleans, LA (US)

( * ) Notice: Subject to any disclaimer, the term of this patent is extended or adjusted under 35 U.S.C. 154(b) by 220 days.

(21) Appl. No.: 15/978,803

(22) Filed: May 14, 2018

Related U.S. Application Data

(63) Continuation-in-part of application No. 14/861,568, filed on Sep. 22, 2015, now Pat. No. 9,968,895.

(51) Int. Cl.
*C02F 3/12* (2006.01)
*B01F 3/04* (2006.01)
*B01F 5/06* (2006.01)

(52) U.S. Cl.
CPC .......... *C02F 3/1284* (2013.01); *B01F 3/0446* (2013.01); *B01F 5/0606* (2013.01); *B01F 2003/04872* (2013.01); *B01F 2215/0052* (2013.01); *B01F 2215/0431* (2013.01)

(58) Field of Classification Search
CPC .... C02F 3/1284; B01F 3/0446; B01F 5/0606; B01F 2215/0431; B01F 2003/04872; B01F 2215/0052
USPC .................................. 366/101–107; 261/123
See application file for complete search history.

(56) References Cited

U.S. PATENT DOCUMENTS

| | | | | |
|---|---|---|---|---|
| 3,148,509 A | * | 9/1964 | Hibburd Laurie Alec | B01F 3/04517 405/22 |
| 3,452,966 A | * | 7/1969 | Smolski | B01F 3/04517 261/77 |
| 3,556,734 A | * | 1/1971 | Peterson | B01D 47/06 422/171 |
| 3,852,384 A | * | 12/1974 | Bearden | B01F 3/04517 261/77 |
| 3,968,086 A | * | 7/1976 | Romanowski | B01F 3/04517 261/77 |
| 4,268,156 A | * | 5/1981 | Kostiner | G03D 3/04 134/102.1 |
| 4,272,461 A | * | 6/1981 | Franklin, Jr. | B01F 3/04609 210/219 |
| 4,334,897 A | * | 6/1982 | Brady | B01D 53/18 96/356 |
| 6,032,931 A | * | 3/2000 | Plunkett | B01F 3/04517 210/220 |
| 6,355,096 B1 | * | 3/2002 | Schmidtke | B01D 19/00 261/123 |
| 6,451,268 B1 | * | 9/2002 | Erdman | B01J 10/00 422/236 |
| 6,726,187 B2 | * | 4/2004 | Ye | F24F 6/02 261/113 |
| 10,426,987 B2 | * | 10/2019 | Pulz | B01F 5/0408 |
| 2007/0029252 A1 | * | 2/2007 | Dunson, Jr. | B09B 3/00 210/603 |

* cited by examiner

*Primary Examiner* — Tony G Soohoo

(57) ABSTRACT

A submersible aerator apparatus is disclosed. The apparatus uses injected air to create both aeration and mixing of a liquid. The apparatus is submersible and may be lowered into a container holding a liquid with suspended and coagulated solids, such as fats, oil, and grease (FOG). Air supplied to the apparatus is injected into the liquid through a hose, which results in an upward flow of large air bubbles and entrained liquid. The upwardly moving large air bubbles are cleaved (i.e., broken apart) by a series of baffle plates that are generally perpendicular to the direction of flow of the air bubbles. This action mixes and aerates the liquid.

20 Claims, 3 Drawing Sheets

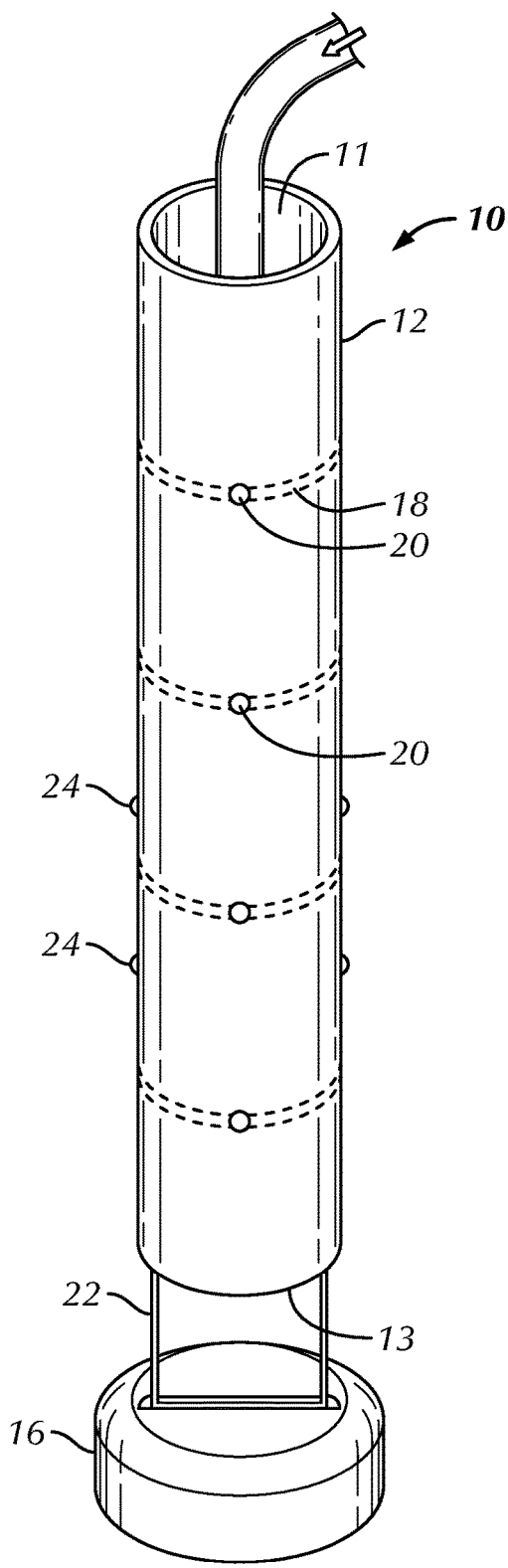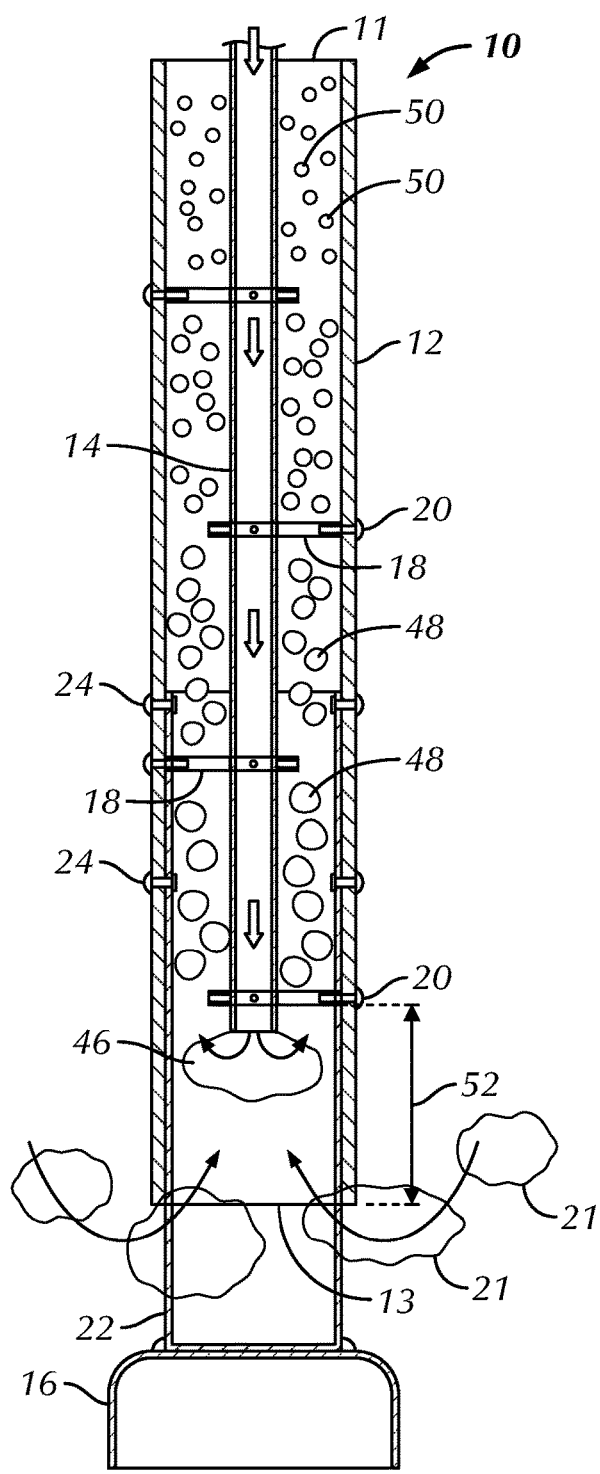
FIG. 1
FIG. 2 ly efficient anaerobic mode in such an environment due to the lack of oxygen. Injecting air creates an aerobic environment (i.e., one with dissolved oxygen present), and thus enables more bacterial activity. Some of this activity will break down waste, which reduces the total waste load leaving the wet well, and thus reduces the waste load reaching the processing facility. There is great value in enhancing the natural breakdown of waste at various points along the waste flow path. To maximize the value of air injection, there also should be substantial mixing of the FOG material and the liquid in the well.

SUBMERSIBLE AERATOR AND MIXING APPARATUS

BACKGROUND OF THE INVENTION

The treatment and handling of waste water and sewage pose numerous challenges. For example, waste water often contains various contaminants. Some of these contaminants tend to coagulate and can form large masses that may make it difficult to move the materials. These materials are typically moved by flow, which can be gravity-induced and induced by pumps.

Fats, oils, and grease (sometimes identified by the acronym FOG) pose a particular problem in the waste treatment industry. These materials are not soluble in water, and as a result, they tend to gather into large masses. Most fats, oils, and grease float, but masses containing these components may also include other, heavier materials. As a result, a holding tank or wet well with waste water may contain numerous masses that may be located almost anywhere in the container.

It has long been known that mixing of the materials in such a setting can be beneficial. The fats, oils, and grease will not dissolve as a result of mixing, but a sufficiently aggressive mixing action can break up large masses or deposits of these materials. In fact, with adequate mixing, these insoluble materials can be broken up into very small particles that will remain suspended in the solution for relatively long periods.

By mixing the contents of a waste holding tank or wet well, the large masses containing fats, oils, grease and other materials can be broken up and distributed throughout the liquid solution. The liquid may then be pumped to another container or to another stage of the treatment process. Once these contaminants have been adequately suspended in the solution (i.e., through vigorous mixing), normal pumps and other equipment may be used to move the liquid. The key, therefore, is to provide sufficient mixing prior to attempting to move the material from the holding tank or wet well.

A variety of devices have been used to mix a solution of waste water that contains fats, oils, grease and other contaminants. One approach with promise is the injection of air into the container. Air will rise to the surface. The rising air bubbles will entrain some of the liquid and cause it to also rise. This action can create substantial movement within the liquid. In addition, as the air bubbles reach the surface of the liquid, the air tends to break up masses that have accumulated on or near the surface of the liquid. Fats, oils, and grease often collect at the surface, so this action of the rising air bubbles helps to break up masses of these materials. Most prior art air injection systems produce very small bubbles to mix with the FOG materials. There are, however, some disadvantages to that approach.

Though various air injection devices have been used, there remains a need for a simple, reliable and portable device. Such a device should be positioned near the bottom of a container when in use. The device should be as simple as possible in design to reduce costs of manufacture and maintenance. The device should be small enough for a small crew to handle, and perhaps even small enough for a single operator to use. The device also should use common industrial equipment for providing air flow (e.g., typical blowers). Finally, the device should include some structure to break up the size of the rising air bubbles and to disrupt their flow path. These actions would create a more turbulent flow and thus may enhance the mixing of the materials.

The injection of air has a second beneficial effect. In a typical wet well of the type described above, there is a lack of dissolved oxygen, or an anaerobic environment. Many bacteria are killed, become dormant, or shift to a less The present invention provides such a device. It is a simple, low-cost solution to the problems identified above. The device is made of rugged, but readily available materials. It can be handled by a small crew, and possibly by a single operator in some circumstances. The present invention allows for free, unrestricted flow of air into the device, but then provides baffles that serve to break up the rising air bubbles (and other materials) and create a more turbulent air flow. In addition, the present invention does not include any narrow flow paths or constrictions that could allow for the accumulation of contaminants, which could then block the flow through the device. Instead, the present invention uses spaced-apart baffles and an open upper end to create vigorous mixing with minimal clogging of the device. The invention is also relatively easy to clean and to disassemble, if necessary during or after a use. For these reasons, the present invention provides a simple, cost-effective device for mixing of waste water containing contaminants like fats, oils, and grease. This invention is an important departure from the air-flow devices of the past, especially those that inject very small (i.e., fine) bubbles into the solution. As explained in more detail below, the present invention injects very large bubbles, which are then broken up into somewhat smaller bubbles as they rise through the device. But even the smallest bubbles in the present invention are typically larger than the bubbles created by most prior art air injection devices.

SUMMARY OF THE INVENTION

In a preferred embodiment, the invention has an elongated cylindrical outer housing; an air supply hose; at least two baffle plates positioned within the elongated cylindrical outer housing such that a primary surface of each baffle plate is perpendicular to a longitudinal axis of the elongated cylindrical outer housing and each baffle plate is spaced at least two inches from all other baffle plates, and wherein, each baffle plate has a semi-circular outer surface that is configured for connection to the elongated cylindrical outer housing and a straight-cut outer surface is not in contact with the outer surface, with the result being an open flow path between the straight-cut outer surface of each baffle plate and the elongated cylindrical outer housing; each baffle plate has a central opening through which the air supply hose extends, and the straight-cut outer surface of each baffle plate is configured for connection to the air supply hose, so that the air supply hose is held securely in a position near the central longitudinal axis of the elongated cylindrical outer housing; a weighted base; and, a bracket connected to the elongated cylindrical outer housing and the weighted base.

In another preferred embodiment, the invention includes the following steps connecting an air supply hose of the submersible aerator to a blower; turning on the blower, so that air flows through the air supply hose and into an elongated cylindrical outer housing of the submersible aerator; lowering the submersible aerator into a container with a liquid solution by holding the air supply hose and allowing a weighted base of the submersible aerator to sink into the liquid solution until the weighted base is at or near the bottom of the container; positioning the air supply hose so that the elongated cylindrical outer housing is as close to vertical as the conditions allow; operating the submersible aerator until the liquid solution has been adequately mixed; removing the submersible aerator from the liquid solution by pulling the air supply hose in an upward direction; and, turning off the blower when the submersible aerator is clear of the liquid solution.

BRIEF DESCRIPTION OF THE DRAWINGS

FIG. 1 is a perspective view of a preferred embodiment of the present invention.

FIG. 2 is a side cross-sectional view of the key components of a preferred embodiment of the present invention. This figure illustrates the invention in use.

DETAILED DESCRIPTION OF PREFERRED EMBODIMENTS OF THE INVENTION

Figure 3A:
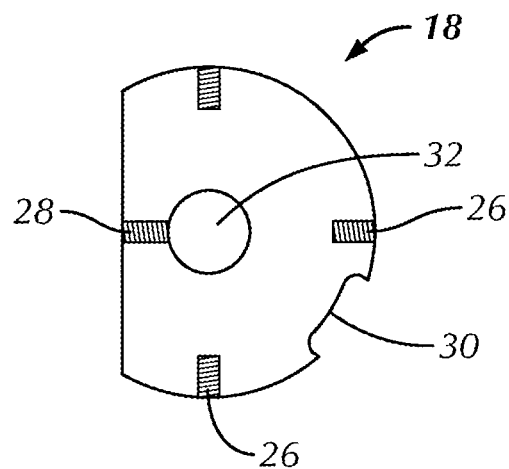
FIGS. 3A and 3B are top views of a baffle plate used in preferred embodiments of the present invention.

A perspective view of a submersible aerator 10 is shown in FIG. 1. The aerator 10 has an elongated cylindrical outer housing 12, an air supply hose 14, and a weighted base 16. There are baffle plates 18 located within the housing 12, but these cannot be directly seen in FIG. 1. The baffles 18 are secured to the housing 12 using baffle plate bolts 20, which are visible in FIG. 1.

The aerator 10 is used by lowering the unit into a holding tank, wet well, or other container with liquid that needs aeration and/or vigorous mixing. The air supply hose 14 is of rugged design, with a relatively thick side wall. This type of hose is used to provide sufficient strength and rigidity to the supply hose 14. The hose 14 supplies air to the aerator 10 during use, but the same hose 14 is also used by operators to raise, lower, or reposition the aerator 10. By using a sufficiently strong and rigid air supply hose 14, the present invention provides a simple, but highly effective, aerator that is easily handled for a small crew or even a single operator.

In a preferred embodiment, the air supply hose is a one inch outside diameter hose with a side wall thickness of at least ⅛ inch. This configuration provides an inner diameter of ¾ inch, which is sufficient for most applications. If more air flow is needed, a larger air supply hose can be used, but this may require use of different baffle plates 18, because these plates have a central opening sized to matched the outer diameter of the supply hose 14. This point is explained more below.

In use, the aerator 10 should be generally vertical. That is, the elongated outer housing 12 should be nearly vertical so that the air bubbles rise in a path parallel to the longitudinal axis of the housing 12, which is defined as the line extending from a central point within the open upper end 11 and the lower end 13 of the housing 12. Given the nature of the containers in which this invention is used, it may not always be possible to position the device in a perfectly vertical alignment, but it is important that the device be at least generally vertical when in use. For example, some containers have awkward access points and others may be so clogged with masses of solids that it is impossible to achieve a truly vertical alignment of the outer housing 12. Even in these situations, it remains important to get the housing 12 into at least a somewhat vertical arrangement.

This result is achieved through use of the weighted base 16. The base may be made of any suitably heavy material, such a lead, stainless steel, or even concrete. The device, however, may be used in environments containing highly corrosive materials, and some concrete may not be suitable for such environments. In one preferred embodiment, an integral, stainless steel base weighing approximately 20 pounds is used. This provides sufficient weight to keep the outer housing 12 in a generally vertical alignment in most situations. At 20 pounds, the base 16 is light enough for one or two persons to easy handle (i.e., together with the weight of the rest of the device).

The base 16 is attached to the housing 12 by a bracket 22. This allows for a space between the base and the open lower end 13 of the housing 12. This arrangement keeps the lower end of the housing 12 raised from the bottom of the container. This can be important because some containers have a large amount of solid or semi-solid material near the bottom. The bracket 22 effectively raises the open lower end 13 of the housing 12 enough to ensure it is above the level of such materials in most situations. The bracket 22, however, is compact enough to ensure the open lower end 13 of the housing 12 is close enough to the bottom of the container to ensure there is vigorous and complete mixing of all materials, including those that may be lodged near the bottom of the container. The bracket 22 is secured to the housing 12 using bracket bolts 24. Rivets, machine screws, commercial adhesive, or other means also may be used to secure the bracket 22 to the housing 12.

A weighted base 16 of at least 10 pounds have been found sufficient for a device having a 3 inch diameter outer housing 12. It is important that a substantial percentage of the total weight of the device be located at or near the lower end of the device. The separate weighted base 16 is one preferred way to achieve this result. An alternative embodiment, without a physically separate weighted base is shown in FIG. 5, and will be discussed more below. Suffice it to say that additional weight may be added to the lower end of the device 10 without using a separate weighted base 16.

The key operational parts of the aerator 10 are shown in FIG. 2. The air supply hose 14 is shown entering the open upper end 11 of the housing 12. The baffle plates 18 are shown in a side cross-sectional manner. Though it cannot be directly seen in FIG. 2, the baffle plates 18 have a central opening sized to match the outer diameter of the air hose 14. In addition, as will be explained more below, the air hose 14 is secured to each baffle plate 18 using a bolt, screw, or other means. This configuration secures the air hose 14 to the baffle plates 18. The baffle plates 18 are secured to the outer housing 12 using baffle plate bolts 20, or other equivalent securing means (e.g., rivets, screws, or adhesive). The baffle plates 18 are installed so that their primary (i.e., largest) surface area is perpendicular to the longitudinal axis of the elongated housing 12. This is the configuration shown in FIGS. 2 and 5. Slight variation for true perpendicular (e.g., due to design tolerances or problems in the field) will not materially affect performance and are within the scope of the meaning of "perpendicular" as used herein.

This configuration is simple, but effective. The air hose 14 is rigid enough to support the weight of all other components. The hose 14 is secured to the baffle plates 18, which are secured to the housing 12. The entire assembly is secure, strong, and relatively simple to assemble or disassemble. In the embodiment shown in FIG. 2, the base bracket 22 is secured using rivets 24. The bracket may be secured to the weighted base 16 by welding, screws, or a suitable adhesive. In a preferred embodiment, the base 16 is welded to the bracket 22.

The operation of the invention can be explained using FIG. 2. Air is supplied (e.g., by any suitable commercial blower) through the air hose 14. There are no restrictions on the hose 14. Instead, the end of the hose 14 is open at a point below the lowest of the baffle plates 18. This allows for a full and free flow of air into the aerator 10. It also means that as air leaves the open end of the supply hose 14, the bubbles first created will be rather large. This is preferred to prevent clogging of the air supply hose 14 during use. In fact, in a preferred method of operation, the air supply is on (i.e., the surface blower is providing air through the hose 14) when the aerator 10 is first placed into the solution. This ensures there is a positive flow of air at all times, which greatly reduces the risk of clogging.

As the large air bubbles leave the open end of the hose 14, they begin to rise. These rising, large air bubbles quickly come into contact with the lowest baffle plate 18. The baffle plate covers more than half the horizontal cross section of the housing 12, which ensure that most of the rising bubbles will hit the plate. This action will break up the bubbles, resulting in smaller bubbles and more turbulence. The same action occurs as the bubbles rise and strike the other baffle plates 18. The bubbles continue to become smaller as they rise.

This aspect of the invention is important, because it is believed that smaller bubbles help to break up smaller masses of contaminants. During the early stages of operation of the aerator in a heavily contaminated liquid, there may be nothing but large masses in the solution. But as the aerator 10 operates, the masses will break up into smaller and smaller particles. By ensuring that the rising bubbles become smaller as they rise, the aerator 10 is able to continue breaking up even small masses of contaminants. The end result is a liquid solution in which most fats, oils, and grease are distributed evenly throughout the liquid, that is, an emulsion is created with the FOG material uniformly suspended within the liquid. When this result is achieved, these insoluble contaminants will remain in suspension for a relatively long period of time, long enough to allow for pumping the solution from the wet well.

Figure 3B:
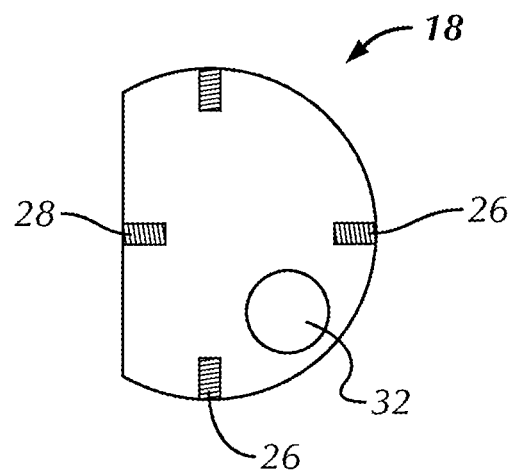

To better break up the rising air bubbles and inducing more turbulence into the flow, the baffle plates are positioned so that their open sections are not aligned. To explain this aspect, it is helpful to view FIGS. 3A and 3B, which shows top (or bottom) views of a baffle plate 18. Note that the left side of the baffle plate 18 is cut off. That is, the plate 18 is somewhat semi-circular, though it is more than one-half of a circle. This configuration results in a semi-circular perimeter section 25 and a straight side cut perimeter section 27, which is created by a chord across the circular arc as shown in FIGS. 3A and 3B. When baffle plate 18 is positioned within the housing 12, the semi-circular perimeter section 25 of the baffle 18 fits against the circular inner surface of the housing 12. The straight-cut perimeter section 27 (on the left in FIGS. 3A and 3B) of the baffle 18 produces an open region in the housing, and this is the path the air bubbles (and entrained liquid and contaminants) take as they rise through the housing 12. The baffle plates 18 are aligned to that their straight-cut perimeter sections 27, and thus the open flow regions, are out of line (see FIG. 2). In the preferred embodiment shown in FIG. 2, the straight-cut perimeter sections 27, and thus the open flow regions, are opposite, that is, 180° out of line from one plate to the next.

Imagine, for example, that the baffle plate 18 shown in FIG. 3A or FIG. 3B is the lowest baffle plate shown in FIG. 2. In this configuration, the open lower end 13 of the air supply hose 14 would be just below this baffle plate 18. The large air bubbles leaving the hose 14 would rise. Any air bubbles that rise along the right side of the housing will hit the solid part of the baffle plate 18. These bubbles will be broken up into smaller bubbles, and will eventually (this takes very little time in actual operation) will migrate to the left, where there is an open area between the straight-cut perimeter section 27 of the baffle plate 18 and the inner surface of the housing 12. This open area is relatively large to reduce the risk of clogging.

We can follow the path of the rising air bubbles, which become smaller due to their impact with the baffle plates 18. This process can be described as cleaving the larger bubbles into smaller ones. Because the opening associated with the lowest baffle plate shown in FIG. 2 is on the left side, there may be a larger concentration of rising bubble on the left side in this embodiment. The next highest baffle plate 18 is positioned in an opposite manner to that seen in FIGS. 3A and 3B. That is, the next baffle plate 18 is positioned so that its straight-cut side is on the right. This means the open path for the flow of air bubbles and entrained matter will now be on the right side of the housing. This arrangement causes more disruption, thus breaking up the air bubbles into even smaller bubbles and created more turbulent flow. This process continues up the vertical length of the housing 12. This structural configuration produces vigorous mixing, while keeping the device simple.

As used herein, the terms higher and lower for baffle plates 18 refer to the position of the plates when the device 10 is in use, or as shown in FIGS. 2 and 5. That is, the baffle plates 18 nearer the surface of the tank 62 in FIG. 5 are higher (or more upper) than those nearer the bottom of the tank. This terminology is used because it makes sense given the operating characteristics of the invention, as just described. It should be understood, of course, that when the device is manufactured, shipped, or stored, the elongated cylindrical housing 12 may be generally horizontal, as opposed to the generally vertical alignment shown in FIGS. 1, 2, and 5. The references to higher, lower, upper and so on used in this description and in the claims still refer to the relative positioning of the baffle plates 18 shown and described herein.

It is now understood that a large, single bubble (item 46 in FIGS. 2 and 5) is usually created at the discharge end of the hose 14 during normal operations. This large bubble 46 is not perfectly spherical in shape, but is a flattened sphere, due to the forces acting against the bubble. The bubble is air that has been injected several feet below the surface of a wet well, so there is a strong upward force acting on the bubble 46, pressing it against the lower surface of the lowest baffle plate 18. This large bubble 46 expands until its outer edge reaches the straight cut side 27 of the baffle plate 18 and the inside surface of the cylindrical housing 12. The bubble 46, therefore tends to fill the entire area directly below the lowest baffle plate 18. The bubble 46 is then broken into smaller bubbles as its edge moves up and around the straight cut perimeter section 27 of the baffle plate 18. This creates smaller bubbles, though these are still moderately large bubbles 48, as shown in FIGS. 2 and 5.

As the bubbles move up, they are cleaved (broken up) by each successively higher baffle plate 18, as described above. In the upper part of the device 10 (i.e., above all the baffle plates 18, small air bubbles 50 exist and these serve to emulsify the FOG materials in the solution. The structure of the invention produces this process of creating a very large bubble initially, and then breaking up the bubbles as they rise. This result has important benefits, as explained more below.

Figure 4:
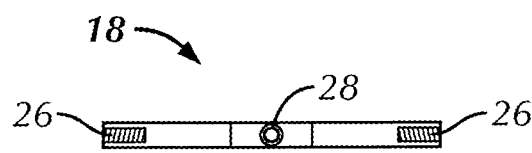
FIG. 4 is a side view of a baffle plate used in a preferred embodiment of the present invention.

The baffle plate 18 shown in FIGS. 3A and 3B could be rotated either 180°, which is what was described above and illustrated in FIG. 2. Alternatively, the baffle plate 18 could be rotated by 90° from one level in the housing to the next. There is no clear preference between these options, but it is preferred to use either one-quarter or one-half rotations. This preference is driven by the desire to keep the baffle plate 18 simple and consistent. All baffle plates 18 may be made exactly as the ones shown in FIGS. 3A, 3B, and 4, if this type of rotation is used. Note that the baffle plate 18 has three threaded holes 26 along the semi-circular circumference, and one threaded hole 28 at the center of the straight-cut side of the baffle plate 18. These holes are positioned 90° apart. This allows for either 90° or 180° rotation of the baffle plates 18 within the housing 12.

The three threaded holes 26 are used to secure the baffle plates 18 to the housing 12. The baffle bolts 20 (as seen in FIGS. 1 and 2) are used for this purpose. The threaded hole 28 along the straight-cut side of a baffle plate 18 is used to secure the air supply hose 14 to the baffle plate 18. In a preferred embodiment, a set screw or bolt is used for this purpose and is tightened until it creates a secure connection to the air hose 14. The screw used for this purpose can pierce the hose 14 without causing concern, however, because there will be only clean air flowing down the hose 14 during normal operations. In addition, in the event the hose 14 does become clogged (perhaps due to the aerator 10 being used incorrectly), the hose may be easily removed and replaced. The air hose 14 is positioned in the hose opening 32 of each baffle plate.

This hose opening 32 can be positioned at the center of the baffle plate 18 (as in FIG. 3A) or it can be offset (as in FIG. 3B). Indeed, the hose 14 may be offset all the way to the edge of the baffle plate 18, so that the hose 14 runs along the inner surface of the housing 12. This configuration is not preferred, because it makes the opposite alignment of adjacent baffle plates 18 more difficult. There may, however, be advantages to having the hose 14 positioned close to or even in full contact with the inside surface of the housing 12, and FIG. 3B shows the sort of configuration for the baffle plates 18 that would allow that to be done.

Note that with the particular positioning shown in FIG. 3B, the plates 18 cannot be rotated 180° without shifting the air supply hose 14 from side to side as it moves from on baffle plate 18 to the next. This arrangement may work in some situations, but it would not be desired due to this design constraint. The plates 18 shown in FIG. 3B, however, could be rotated 90°, though this also could result in some rotation or twisting of the air supply hose 14. For rotation of 90° or less, the position of the hose opening 32 could be rotated to keep the air supply hose 14 straight. This, however, would require baffle plates 18 with different configurations, and would make assembly and parts supply more critical. For this reason, the configuration shown in FIG. 3B, though workable, is not as preferred as that shown in FIG. 3A.

The baffle plate 18 shown in FIG. 3 has a notch 30 in the semicircular part of its circumference. This notch allows for a small amount of flow, and serves to create additional turbulence. In a preferred embodiment, a notch 30 may be included in the lower two baffle plates 18 to allow space for the bracket 22 that connects the weighted base 16 to the housing 12. If this design is used, the upper baffle plates 18 could be made without the notch 30, though retaining it may provide even greater mixing. Alternatively, a bracket 22 could be used that is positioned on the outside surface of the housing, so that the notch 30 would not be required. These design variations are not critical to the operation of the invention.

It also should be noted that it is not necessary to the operation of the invention that the baffle plates 18 be rotated as explained above. Such a configuration is preferred for two reasons. First, as explained above, it is believed that this arrangement will produce better results during use of the invention. Second, this arrangement may produce a more solid and rigid device, because the connections between the housing 12 and the baffle plates 18 will be spaced apart rather than all aligned. But the invention can be made and used with all the straight-cut sides of the baffle plates 18 aligned. This is not preferred, but it is within the scope of the invention, and may be easier to assemble.

Finally, it also should be noted that the present invention does not include any barriers or obstacles to flow other than the baffle plates 18. The plates are spaced well apart and all include a relatively large open area between their straight-cut side and the housing 12. The purpose of this design is to provide turbulence and break up the air bubbles without unduly restricting the flow. This invention is designed for use in environments that may contain large masses of insoluble fats, oils, and grease. It is important, therefore, to ensure that the flow path is clear enough to prevent these types of materials from clogging within the device. The present invention achieves this result using a novel, but simple, design.

The hydrodynamics of the invention are best understood by considering FIGS. 2 and 5 together. By creating air bubbles that rise inside the cylindrical housing 12, the surrounding liquid and FOG materials are entrained, that is, these materials are pulled into the housing 12 by the upward air flow. Masses of FOG material 21 are pulled into the housing 12, which is sufficiently large to move such materials without clogging. The FOG materials are also broken up by the baffle plates 18 in a manner similar to that described above for the air bubbles.

In addition, the FOG material mixes with the air bubbles as the two rise together through the cylindrical housing 12. This mixing effectively emulsifies the liquid/FOG mixture, thus making it suitable for pumping, for example with a large waste pump 66 (see FIG. 5). This mixing of air, water, and FOG material also creates an aerobic environment in the wet well (i.e., dissolved oxygen is present) which allows bacteria to break down more of the waste materials. By operating the device 10 continuously, these conditions are maintained, which can significantly reduce the waste load and the need to use other means to clean out the wet well. The distance 52 between the upper surface of the large bubble 46 and the intake of the device 10 is an important aspect of the present invention. This parameter is defined as $d_{flow}$, or the flow protection distance, for reasons explained below. In short, $d_{flow}$ must be sufficient to ensure the large bubbles 46 created by the device flow upward, rather than being pulled downward by external forces.

The intake may be the open lower end 13, as shown in FIG. 2, or it may be a number of large holes 44 (or other openings) near the lower end of the device, as shown in FIG. 5. The liquid and FOG material enters the device 10 through the intake. The upper mark for the distance 52 (i.e., $d_{flow}$) is the upper surface of the large bubble 46, but this point cannot be measured when the device is being made. Because the upper surface of the bubble 46 will press against the lower side of the lowest baffle plate 18, this point is used in practice for measuring $d_{flow}$ 52.

The distance $d_{flow}$ 52 is important, because the large air bubble 46 must remain within the cylindrical housing 12. The waste pump 66 will have an intake 64 near the bottom of the wet well. When this pump operates—in many situations, these pumps operate continuously or nearly continuously—it will create a suction at its intake 64, which is in the lower area of the well. This suction will tend to pull liquid, air, and any other material out of the intake of the device 10. The pump 66 has a discharge 68 out of the well.

The present invention prevents this undesired result—that is, where the pump 66 pulls air and other material out of the intake of the device 10—by creating a large bubble 46, and ensuring that this large bubble 46 remains far enough above the intake to prevent the pump 66 from being able to pull the large bubble 46 down and out of the device 10. The creation of a large bubble 46 is important, because there is a greater upward force on a large bubble than on a smaller bubble. That is, the buoyancy force is proportional to the volume of liquid displaced, which in this context means the size of the bubble.

If only small air bubbles exist in the lower end of the housing 12, the waste pump 66 might be capable of pulling the air bubbles out of the intake of the housing 12. This would render the device ineffective, or at least much less effective.

The present invention combines two design elements to prevent this outcome. First, very large bubbles are created at the outlet of the air hose 14, and these large bubbles are harder to pull down and out the intake of the housing 12. As shown in FIGS. 2 and 5, the invention creates a bubble that essentially fills the entire area below the lowest baffle plate 18. In a preferred embodiment with a 3" diameter housing 12, this initial bubble will reach almost 3" in diameter before being cleaved by the straight-cut side 27 of the baffle plate 18.

The second feature of the present invention that prevent the pump 66 from pulling air bubbles out of the device, is the distance $d_{flow}$ 52, which is selected to ensure that the large air bubble 46 cannot be pulled out of the housing 12 by the waste pump 66. The exact distance 52 required varies with the size of the housing 12, because the size of the large bubble 46 will vary with housing diameter.

There are two opposing forces acting on the large bubble 46, or on any bubbles near the intake of the device 10. These bubbles are much less dense than the solution, and therefore, a substantial upward buoyancy force is exerted on the bubble, making it tend to rise. At the same time, the waste pump 66 suction exerts a downward force on the bubble 46, which tends to pull the bubble 46 down the housing 12 and out into the well 60. The suction created by the pump 66 will decrease with distance from the pump intake 64. To ensure proper operation of the invention, it is important to ensure that under any operating conditions, the upward buoyancy force acting on the large bubble 46 exceeds the downward suction force created by the pump 66. This result is achieved by using a sufficient $d_{flow}$ 52. In this embodiment, $d_{flow}$ 52 is still defined as the distance between the lower edge of the lowest baffle plate 18 and the upper edge of the intake of the device 10.

In a preferred embodiment, the housing 12 is 3 inches in diameter, though a housing between 2½ and 3½ inches in diameter will perform quite well. This size range works well in most situations. It is small enough to be easy to handle and easy to get into proper position within a wet well 60. And it is large enough, with a ¾" inside diameter air hose 14, to move enough air and entrained liquid to achieve the mixing and aeration results described above.

It has been found that with a 3" diameter housing 12, an optimum value for $d_{flow}$ is 6". A minimum distance 52 of 4" will work with a 3" diameter housing, but there is an increased chance that performance will be reduced somewhat by losses of air flow out the intakes of the device. Setting $d_{flow}$ between five and six inches when a three inch diameter housing 12 is used provides excellent results.

Though the ratio of the housing diameter to the optimum $d_{flow}$ distance 52 is approximately 2:1 for a three inch diameter housing 12, this ratio is not a constant. This is because the upward force on a large bubble increases as the size of the bubble increases (i.e., buoyancy force is proportional to the volume of displaced liquid). For example, if a four inch diameter housing 12 is used, then the large bubbles 46 will approach four inches in diameter before they break up and begin to rise. It would take more force to pull down a four inch diameter bubble than a three inch diameter bubble.

The optimum $d_{flow}$ distance 52 for a four inch diameter housing 12 has not been precisely determined, but it is predicted that optimum $d_{flow}$ will be about six inches for this configuration. That produces a ratio of about 3:2, rather than the 2:1 ratio found for a three inch housing. If a smaller housing is used (e.g., a two inch housing), the ratio will be greater than 2:1 because the smaller bubbles created would be more easily pulled downward by the suction of the waste pump 66. Indeed, for any practical housing diameter, $d_{flow}$ will be at least four inches.

The embodiment shown in FIG. 5 differs from that shown in FIGS. 1 and 2, but the operation is essentially the same. There is an external air hose 42 that is positioned outside the housing 12, and that enters the housing just below the lowest baffle plate 18. The entry point is positioned opposite the straight cut side 27 of the baffle plate 18, which allows a large bubble to form as described above.

In this embodiment, the external hose 42 may be a flexible hose or rigid tubing. If rigid tubing is used, some additional means may be needed to insert and retrieve the device. The external hose 42 may be attached to the housing 12 using any standard means, such as hose clamps, brackets, or even directly screwed to the housing 12.

In the embodiment shown in FIG. 5, the baffle plates 18 do not have the center hose opening 32 (see FIG. 3). Instead the baffle plates are solid. All other aspects of the baffle plates 18 are unchanged. This configuration increases the exposed surface area of the baffle plates 18, and may produce greater cleaving of the air bubbles.

The embodiment shown in FIG. 5 also shows a different intake design. Instead of the open lower end 13 shown in FIGS. 1 and 2, the embodiment in FIG. 5 has a number (at least two) of large holes or other openings in the side of the housing 12 near its lower end.

In FIG. 5, the lower end of the housing 12 is weighted by incorporating a thick layer of heavy material 54 in this area of the device. For example, a number of plates 54 may be incorporated into the lower end of the housing 12. This creates a closed lower end (except, of course, for the large intake openings), and eliminates the need for a physically separate weighted bottom 16 (see FIGS. 1 and 2). Alternatively, rings of heavy material may be placed around or welded to the lower end of the housing.

It has been found that at least one-half the total weight of the device 10 should be located within the lowest one-quarter of its length. This bottom-heavy design ensures the device 10 remains generally vertical during normal operations, as explained above. This weight distribution may be achieved in various ways, and the invention is not limited in this regard. As long as half the weight is in the lowest quarter of the device, the bottom-heavy weighting requirement is satisfied, and satisfactory performance will be achieved. It also has been found that the device 10 should weigh at least 10 pounds and preferably 15 pounds for a housing 12 with a diameter within the ranges of 2½-3½ inches. A device of this size will work well if it is heavier, but if its weight exceeds 20 or 25 pounds, it may become unwieldy during installation into a wet well.

Figure 5A:
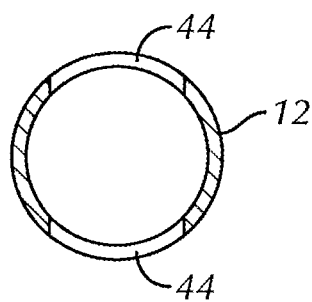
FIGS. 5A and 5B show cross-sectional views of two alternative intake configurations for the embodiment shown in FIG. 5.
Figure 5B:
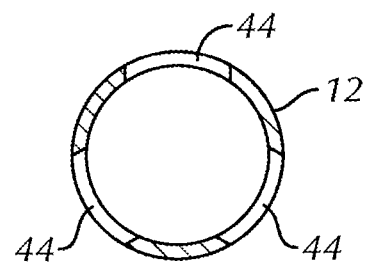
Figure 5:
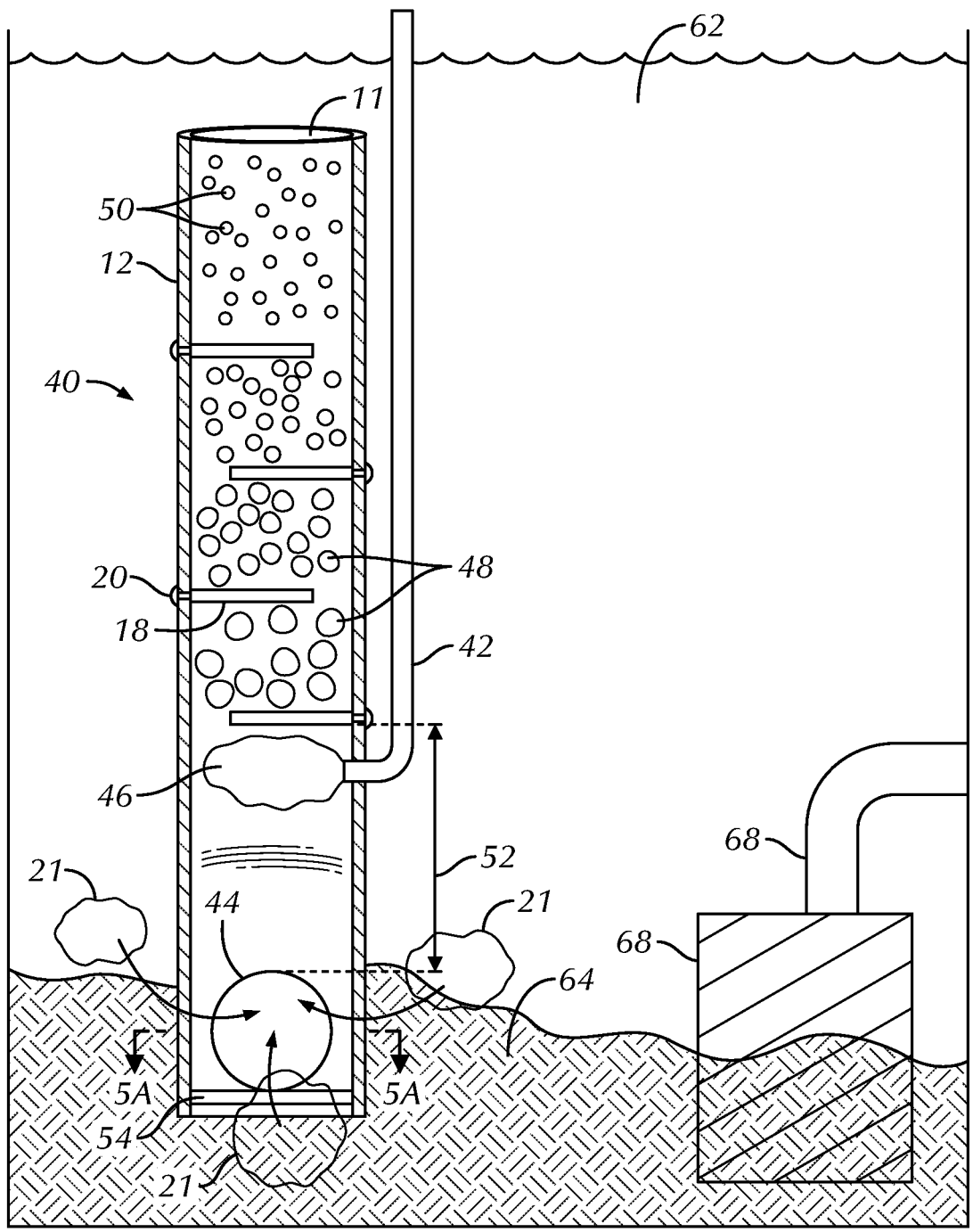
FIG. 5 is an illustration of an alternative embodiment of the invention within a wet well containing FOG material.

The alternative embodiment shown in FIG. 5 uses large holes as intakes, and two alternatives for these holes are shown in FIGS. 5A and 5B, with two and three large intake holes, respectively. The holes shown are circular, but any type of large openings may be used as intakes. The intakes must be large enough to allow FOG material to easily enter the lower end of the housing 12 during operation. In the embodiment shown in FIGS. 1 and 2, the intake is the size of the housing. The intakes of the embodiment shown in FIG. 5 may be somewhat smaller, but there will be at least two of them. The size and configuration of the intakes may be varied to meet particular needs of the situation.

The baffle plate 18 covers a percentage of the total internal cross-sectional area of the housing 12, as can be inferred from FIGS. 2 and 3, together with the description above. In the most preferred embodiment (i.e., that shown in FIGS. 1 and 2), the distance, through the center of the baffle plate 18, to the straight cut edge 27 must be sufficient to provide some baffle plate material on all sides of the internal hose opening 32 (FIG. 3). On the straight cut side 27 of the opening 32, approximately ¼" of baffle plate material exists, which provides a sufficiently strong piece of material for securing the hose 14. The set screw 28 shown in FIG. 3 goes through this part of the baffle plate 18 and presses against, or even pierces, the hose 14, thus securing it to the baffle plate 18.

For a 3" diameter housing 12, and the baffle plate configuration shown in FIG. 3, the baffle plate covers approximately 80% of the internal cross-sectional area of the housing, without accounting for the hose opening 32. The opening 32 is about 10% of the cross-sectional area, but this area is filled with the hose 14, so it is not surface area available to support or cleave rising bubble. With the hose opening 32 removed from the effective surface area, the baffle plate covers about 70% of the cross-sectional area in this embodiment. The open region created by the straight cut section 27 of the baffle plate 18 (as explained above) covers about 20% of the internal cross-sectional area of the housing 12. These figures are close approximations, and are not required by the invention. Figures close to these approximations, however, will work well.

When the alternative embodiment shown in FIG. 5 is used, there is no internal hose opening 32 in the baffle plates 18, since the hose 42 is external to the housing 12. That means baffle plates 18 of the same general size, though without the hose opening 32, will cover a greater portion of the cross-sectional area. Using the figures provided above for a 3" diameter housing, the baffle plates 18 would cover about 80% of the cross-sectional area, rather than 70%. This difference will not significantly alter the performance of the device, but it is possible to make the open region larger in this alternative embodiment.

In other words, in the alternative embodiment, the baffle plate could be smaller while still creating the same amount of cleaving surface area. For example, if the baffle plates 18 in this embodiment cover about 70% of the cross-sectional area, that would result in an open region that accounts for about 30% of the cross-sectional area, as compared to 20% for the preferred embodiment described above. This alternative configuration might perform better in certain situations, for example, if there is an unusually large amount of dense, thick FOG material in the well or tank. Having larger open regions adjacent to each baffle plate 18 might enhance flow of such thicker FOG material up through the housing 12.

In the preferred embodiments, the housing 12 is made of HDPE (high density polyethylene), which is strong and does not corrode in most environments. The baffle plates 18 are also made of HDPE. Most fittings are stainless steel. For use in caustic or highly corrosive environments, the housing 12 and baffle plates 18 might require a material other than HDPE or related synthetic material. Stainless steel or other alloys will work in caustic environments, and the invention may be made of any such material in order to allow it to withstand the rigors of the particular operating environment. Such a special-made version of the invention would probably cost substantially more to manufacture, but the benefits may justify such expense in some situations. These types of variations are fully within the scope of the invention disclosed and claimed herein.

The spacing shown in FIGS. 1, 2, and 5 are illustrative and not necessarily to scale. For example, as explained above, in a preferred embodiment with a 3" diameter housing 12, the distance $d_{flow}$ 52 should be about 5-6", with a minimum of about 4". The distance between baffle plates 18 in this embodiment is about 2", though the plates 18 could be spaced closer together in the upper sections of the housing 12, because the bubbles are smaller in this region. For example, baffle plate spacing could be as littles as 1" between the uppermost and next lower baffle plate, and 2" between the lowest plate and the next plate above it. Spacing between the middle plates could vary between 1" and 2". Constant plate 18 spacing of as little as 1" may perform well in some situation, particularly if the housing 12 is smaller (e.g., with a 2" diameter housing).

The uppermost baffle plate 18 may be closer to the open upper end 11 of the housing 12 than is illustrated in FIGS. 1, 2, and 5. In fact, the uppermost baffle plate may be within 1" of the open upper end 11, without compromising the performance of the device. If the invention is to be used in shallower wells or tanks, it is possible to reduce the number of baffle plates (at least two are needed), reduce the spacing between plates, and reduce the distance from the uppermost plate and the open upper end 11 of the housing 12. Changes of this nature are fully within the scope of the present invention.

It also should be noted that the bubbles created by the present invention begin much larger than those in most prior art air injection devices. The prior art devices typically use some type of fine diffuser to generate very small bubbles in the solution. The present invention does the opposite. In fact, even the smallest bubbles created by the present invention are usually substantially larger than the bubbles found in a typical prior art air injection device. The bubbles formed in the present invention are cleaved (i.e., broken apart) by the baffle plates 18, and therefore become smaller as they rise (as illustrated in FIGS. 2 and 5). But even the smaller bubbles in the upper parts of the housing are typically larger than the bubbles found in prior art devices. It is believed that the larger bubbles of the present invention contribute to its excellent performance in moving fluid and emulsifying FOG material.

While the preceding description is intended to provide an understanding of the present invention, it is to be understood that the present invention is not limited to the disclosed embodiments. To the contrary, the present invention is intended to cover modifications and variations on the structure and methods described above and all other equivalent arrangements that are within the scope and spirit of the following claims.

I claim:

1. A submersible aerator and mixing apparatus, comprising:
   a. an elongated cylindrical outer housing having:
      i. an open upper end; and,
      ii. a weighted lower end, such that a longitudinal axis of the housing extends from the open upper end to the weighted lower end;
   b. at least two baffle plates connected to an inside surface of the elongated outer housing, wherein each baffle plate:
      i. is positioned perpendicular to the longitudinal axis of the housing;
      ii. is positioned at least one inch from any adjacent baffle plate;
      iii. has a semi-circular perimeter section and a straight-cut perimeter section; and,
      iv. is aligned so the straight-cut perimeter section of each baffle plate is out of alignment with each adjacent baffle plate;
   c. an air supply hose with a terminal end positioned just below a lowest baffle plate;
   d. an intake near the weighted lower end of the housing, such that a parameter $d_{flow}$ (flow protection distance) is defined as a distance from a lower side of the lowest baffle plate to an upper edge of the intake.

2. The apparatus of claim 1, wherein the weighted lower end further comprises a separate weighted base that is positioned at least two inches below the intake.

3. The apparatus of claim 1, wherein the intake is an open lower end of the elongated cylindrical housing.

4. The apparatus of claim 1, wherein the cylindrical housing is between 2½-3½ inches in diameter and $d_{flow}$ is at least 4 inches.

5. The apparatus of claim 4, wherein the cylindrical housing is 3 inches in diameter and $d_{flow}$ is 5-6 inches.

6. The apparatus of claim 1, wherein there are four baffle plates.

7. The apparatus of claim 6, wherein the four baffle plates are aligned so the straight-cut perimeter section of each baffle plate is approximately 180° out of alignment with each adjacent baffle plate.

8. The apparatus of claim 1, wherein weighted lower end weighs at least 10 pounds.

9. The apparatus of claim 1, wherein at least one-half the total weight of the apparatus is located within the lowest one-quarter of its length.

10. The apparatus of claim 1, wherein the elongated outer housing, the baffle plates, and the weighted lower end are made of stainless steel or another highly corrosion-resistant material.

11. The apparatus of claim 1, wherein the baffle plates further comprise an internal opening through which the air supply hose extends, such that the air supply hose enters the elongated cylindrical housing through the open upper end and is secured to each baffle plate within the housing.

12. The apparatus of claim 1, wherein the air supply hose enters the elongated cylindrical housing at a point just below the lowest baffle plate.

13. The apparatus of claim 1, wherein each baffle plate has a surface area equal to approximately 70% of the cross-sectional surface area of the elongated cylindrical housing.

14. The apparatus of claim 1, wherein each baffle plate is secured to the housing using at least three bolts.

15. A submersible aerator and mixing apparatus comprising:
   a. an elongated cylindrical outer housing having an open upper end and a weighted lower end, such that a longitudinal axis of the housing extends from the upper end to the lower end;
   b. an intake near the weighted lower end;
   c. an air supply hose that enters the housing through the open upper end;
   d. four baffle plates connected to the elongated cylindrical outer housing so that a primary surface area of each baffle plate is perpendicular to the longitudinal axis of the housing, wherein,
      i. each baffle plate has a semi-circular outer surface that is configured for connection to an inner surface of the elongated cylindrical outer housing;
      ii. a straight-cut outer surface that is not in contact with the inner surface of the elongated cylindrical outer housing, with the result being an open flow path between the straight-cut outer surface of each baffle plate and the elongated cylindrical outer housing; and,
      iii. an internal opening through which the air supply hose passes, such that the air supply hose is secured to each baffle plate and terminates just below a lowest baffle plate.

16. The apparatus of claim 15 wherein each baffle plate is spaced at least two inches from each adjacent baffle plate.

17. The apparatus of claim 15, wherein the weighted lower end further comprises a bracket and a separate weighted base.

18. The apparatus of claim 15, wherein a parameter $d_{flow}$ is defined as the flow protection distance and is the distance from a lower surface of a lowest baffle plate to an upper edge of the intake.

19. A submersible aerator and mixing apparatus comprising:
   a. an elongated cylindrical outer housing having an open upper end and a weighted, open, lower end, such that
      i. a longitudinal axis of the housing extends from the upper end to the lower end; and,
      ii. an intake is created by the open, weighted lower end;
   b. an air supply hose that enters the housing through the open upper end;
   c. four baffle plates bolted to the elongated cylindrical outer housing so that a primary surface area of each baffle plate is perpendicular to the longitudinal axis of the housing, wherein,
      iv. each baffle plate has a semi-circular outer surface that is configured for connection to an inner surface of the elongated cylindrical outer housing;
      v. a straight-cut outer surface that is not in contact with the inner surface of the elongated cylindrical outer housing, with the result being an open flow path between the straight-cut outer surface of each baffle plate and the inner surface of the elongated cylindrical outer housing, and wherein the baffle plates are arranged so that each baffle plate is out of alignment with each adjacent baffle plate; and, vi. an internal opening through which the air supply hose passes, such that the air supply hose is secured to each baffle plate and terminates just below a lowest baffle plate.

20. The apparatus of claim 19, wherein each baffle plate is approximately 180° out of alignment with each adjacent baffle plate.

\* \* \* \* \*